United States Patent [19]

Greenwood

[11] Patent Number: 4,662,240
[45] Date of Patent: May 5, 1987

[54] CONTINUOUSLY VARIABLE TRANSMISSION

[75] Inventor: Christopher J. Greenwood, Leyland, United Kingdom

[73] Assignee: Leyland Vehicles Limited, Leyland, United Kingdom

[21] Appl. No.: 799,842

[22] Filed: Nov. 18, 1985

[30] Foreign Application Priority Data

Nov. 26, 1984 [GB] United Kingdom ............... 8429823

[51] Int. Cl.⁴ .................................................. F16H 37/06
[52] U.S. Cl. ........................................ 74/690; 74/681; 74/377
[58] Field of Search .................. 74/681, 687, 690, 377

[56] References Cited

U.S. PATENT DOCUMENTS

| | | | |
|---|---|---|---|
| 2,164,504 | 7/1939 | Dodge | 74/690 |
| 2,755,683 | 7/1956 | Ryan | 74/690 X |
| 3,494,224 | 2/1970 | Fellows et al. | 74/691 |
| 3,545,302 | 12/1970 | Schofield | 74/691 |
| 4,233,851 | 11/1980 | Kemper | 74/690 X |
| 4,297,918 | 11/1981 | Perry | 74/690 |
| 4,355,547 | 10/1982 | Poole et al. | 74/690 |

FOREIGN PATENT DOCUMENTS

| | | |
|---|---|---|
| 3025349 | 2/1981 | Fed. Rep. of Germany . |
| 1078791 | 8/1967 | United Kingdom . |
| 1525861 | 9/1978 | United Kingdom . |
| 2136893 | 9/1984 | United Kingdom . |

*Primary Examiner*—Allan D. Herrmann
*Attorney, Agent, or Firm*—Hayes, Davis & Soloway

[57] ABSTRACT

A driveline for an engined vehicle, comprises a continuously-variable ratio transmission (1) having an input adapted to be driven by the engine and an output (3), a final drive shaft (8) for providing an output from the driveline, and means for driving the final drive shaft from the continuously-variable ratio transmission in either high or low regime. In low regime the final drive shaft is driven by the output (7) of an epicyclic (4) having first and second inputs (6,5) connected to be driven respectively by the said engine and by the said continuously-variable ratio transmission output and in high regime the final drive shaft is driven directly by the output (3) of the continuously-variable ratio transmission.

12 Claims, 2 Drawing Figures

CONTINUOUSLY VARIABLE TRANSMISSION

The present invention relates to continuously variable transmissions (often abbreviated to CVTs).

Continuously variable transmissions are transmissions which provide a continuous spread of transmission ratios between a given maximum and minimum. As such they are well suited for use as drivelines in vehicles which have to deliver a wide variety of torques, and are particularly suitable for use in vehicles which also benefit from running their engines at a substantially constant speed.

One known type of continuously variable transmission comprises a variator of the toroidal race rolling traction type, which receives an input from an engine shaft, and drives one input of an epicyclic, the other input of which is driven directly by the engine, and the output of which provides the transmission output. This arrangement allows the transmission to move the vehicle away from stationary without the need for a clutch. If a greater speed range is required, a second regime may be incorporated to allow the transmission to operate in two regimes, low and high.

According to the present invention there is provided a driveline for an engined vehicle, comprising a continuously-variable ratio transmission havng an input, adapted to be driven by the engine, and an output, a final drive shaft for providing an output from the driveline, and means for driving the final drive shaft from the continuously-variable ratio transmission in either high or low regime, wherein in low regime the final drive shaft is driven by the output of an epicyclic having first and second inputs connected to be driven respectively by the said engine and by the aid continuously-variable ratio transmission output and in high regime the final drive shaft is driven directly by the output of the continuously-variable ratio transmission.

Embodiments of the invention may be particularly suitable for use in agricultural tractors, for example.

Reference will now be made, by way of example, to the accompanying drawings, in which.

Figure 1:
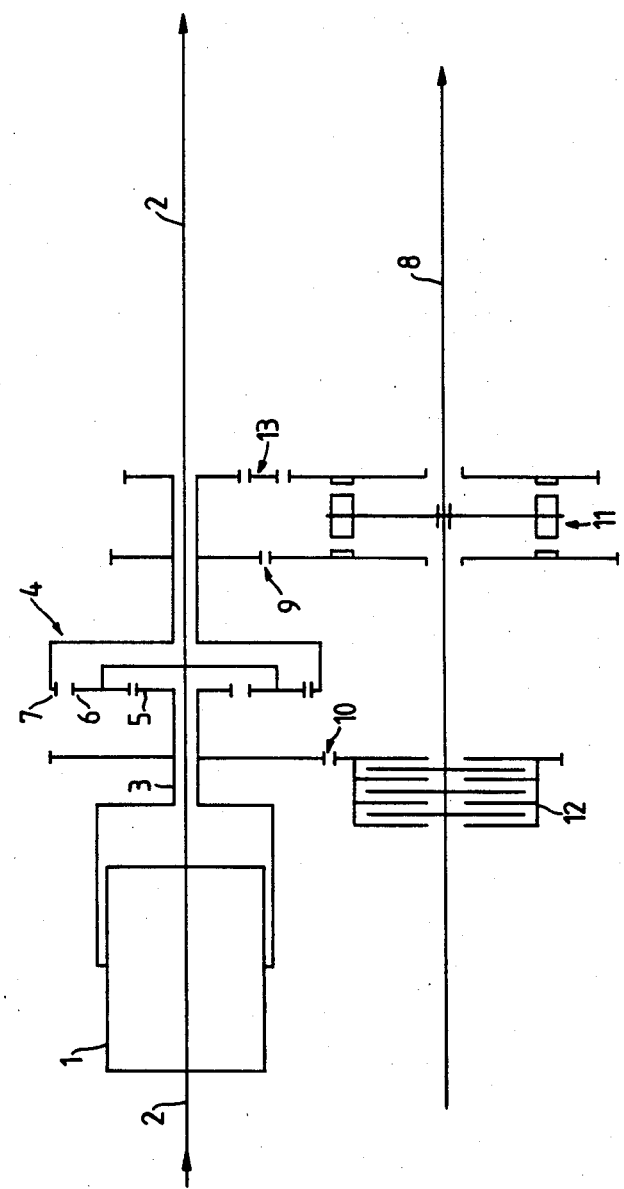
FIG. 1 shows a transmission system embodying the present invention.

As shown in FIG. 1, a variator 1, of the toroidal race rolling traction type receives an input from an engine (not shown) by way of an engine output shaft 2, and provides an output via an output shaft 3. An epicyclic 4 has its sun gear 5 driven by the variator output shaft 3 and its planet carrier 6 driven by the engine shaft 2. The annulus 7 of the epicyclic provides drive to a final drive shaft 8 by way of gearing 9, thereby to provide a low regime output. High regime output to the final drive shaft is provided directly by the variator output alone, through gearing 10. In this example, the engine shaft 2 passes through the transmission system, thereby to provide a power take-off at its exposed end.

The gearing 9 and the gearing 10 can be individually engaged and disengaged from the final drive shaft 8, by means of clutches 11, 12, to allow the transmission to operate both in low and high regime. The annulus of the epicyclic may also drive further gearing 13, also engagable and disengagable from the final drive shaft by means of a clutch, to provide a reverse gear in low regime.

In use, the gearing 9 is first engaged with the final drive shaft 8, while the gearing 10 is disengaged. This puts the transmission in low regime. To hold the vehicle stationary, with the final drive shaft not rotating, the transmission ratio of the variator is set so that the planet carrier of the epicyclic rotates at a speed which counterbalances the effect of the rotating sun gear, thereby providing a geared neutral. To move off, the variator transmission ratio is gradually reduced, so that power is gradually fed to the annulus, lower variator ratios in low regime giving a higher overall drive ratio. At an appropriate variator transmission ratio, the change is made from low to high regime by engaging the gearing 10 with the final drive shaft and disengaging the gearing 9, and hence the epicyclic. This change is made synchronously. That is to say that across the change the variator ratio remains substantially constant, allowing the high regime gearing to be engaged with the final drive shaft before the low regime gearing is disengaged. This allows drive to be maintained during the change, and in addition removes the need for slipping clutches to engage the gears, allowing either dog clutches, for example, or plate-type clutches (such as multiplate clutches) to be used.

To increase the speed further, the transmission ratio is then increased, increasing the overall drive ratio, maximum overal drive ratio in high regime being achieved at maximum variator ratio.

In a transmission having a separate reverse gear, the epicyclic ratio is chosen such that geared neutral is achieved towards the upper end of the variator ratio range, for example at a variator ratio of $-1.5$. The ratio of the reverse gearing may either be the same as that of the low regime forward gearing, giving the same maximum speed in reverse as in low regime forward, or it may be different. For example, the ratio of the gearing 9 may be $-0.91$, and the ratio of the gearing 13 may be $+1.36$. In this example, synchronous change can be achieved with an epicyclic having a ratio of 2.5

$$N_A N_C = 0$$

(where $N_A$ is the speed of rotation of the annulus, $N_S$ is the speed of rotation of the sun gear and $N_C$ is the speed of rotation of the planet carrier) and high regime gearing 10 having a ratio of $+1.11$. Synchronous change can then be made at a variator ratio of $-0.37$, corresponding to a final drive ratio of 0.411. If the variator has a maximum ratio of $-1.5$, this will give a final drive ratio of 1.66 in high regime. It should be noted that in this example, the epicyclic has a compound planet gear system. This is necessary to achieve the desired positive basic ratio.

Figure 2:
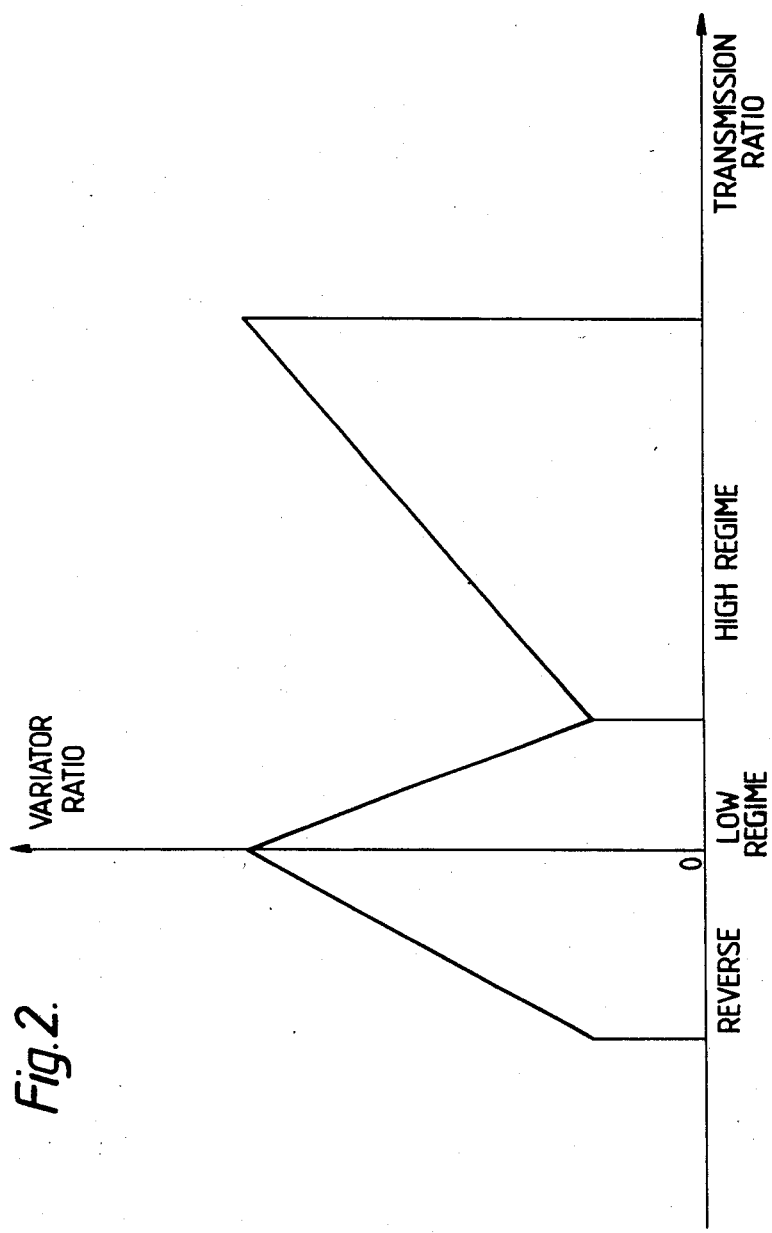
FIG. 2 is a graph

FIG. 2 is a graph showing the relationship between the final drive ratio and and the variator transmission ratio through reverse, low regime and high regime in the embodiment described above. It will be seen that at the change between low and high regime, the variator ratio remains substantially constant, giving a smooth synchronous change.

I claim:

1. A driveline for an engined vehicle, comprising a continuously-variable ratio transmission (1) having an input adapted to be driven by the engine and an output (3), a final drive shaft (8) for providing an output from the driveline, and means for driving the final drive shaft from the continuously-variable ratio transmission in either high or low regime, wherein in low regime the final drive shaft is driven by the output (7) of an epicyclic (4) having first and second inputs (6,5) connected to be driven respectively by the said engine and by the said continuously-variable ratio transmission output and in high regime the final drive shaft is driven directly by the output (3) of the continuously-variable ratio transmission.

2. A driveline as claimed in claim 1, wherein the said first and second inputs of the epicyclic comprise the planet carrier (6) and sun gear (5) respectively, the annulus (7) providing drive to the final drive shaft (8).

3. A driveline as claimed in claim 1, wherein the planet arrangement of the epicyclic is compound.

4. A driveline as claimed in claim 1, wherein the final drive shaft is driven, by the annulus in low regime and by the continuously-variable ratio transmission output in high regime, by means of gears (9, 10).

5. A driveline as claimed in claim 1, wherein the epicyclic ratio $R = N_A N_C = O$ is in the range 2 to 3.

6. A driveline as claimed in claim 5, wherein the said ratio R is substantially 2.5.

7. A driveline as claimed in claim 1, wherein the drive ratio L between the said epicyclic and the final drive shaft in low regime forward is in the range $-0.8$ to $-1.0$.

8. A driveline as claimed in claim 7, wherein the drive ratio L is substantially $-0.91$.

9. A driveline as claimed in claim 1, wherein the drive ratio H between the output of the continuously-variable ratio transmission and the final drive shaft in high regime is in the range $-1.0$ to $-1.2$.

10. A driveline as claimed in claim 9, wherein the ratio H is substantially $-1.11$.

11. A driveline as claimed in claim 1, including reverse gearing (13) in low regime.

12. A driveline as claimed in claim 1, wherein the continuously-variable ratio transmission (1) is of the toroidal race-rolling traction type.

* * * * *